US012284622B2

(12) United States Patent
Catovic et al.

(10) Patent No.: US 12,284,622 B2
(45) Date of Patent: Apr. 22, 2025

(54) NON-ACCESS STRATUM CONGESTION INDICATIONS

(71) Applicant: QUALCOMM Incorporated, San Diego, CA (US)

(72) Inventors: Amer Catovic, San Diego, CA (US); Osama Lotfallah, San Diego, CA (US); Stefano Faccin, San Ysidro, CA (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 17/303,335

(22) Filed: May 27, 2021

(65) Prior Publication Data

US 2021/0377789 A1 Dec. 2, 2021

Related U.S. Application Data

(60) Provisional application No. 63/033,812, filed on Jun. 2, 2020.

(51) Int. Cl.
*H04W 60/00* (2009.01)
*H04W 76/10* (2018.01)
*H04W 84/12* (2009.01)

(52) U.S. Cl.
CPC .......... *H04W 60/00* (2013.01); *H04W 76/10* (2018.02); *H04W 84/12* (2013.01)

(58) Field of Classification Search
None
See application file for complete search history.

(56) References Cited

U.S. PATENT DOCUMENTS

| 9,445,323 B1* | 9/2016 | Ramamurthy .... H04W 36/0033 |
| 2009/0129386 A1* | 5/2009 | Rune .................. H04L 12/4641 |
| | | 370/392 |

(Continued)

FOREIGN PATENT DOCUMENTS

| CN | 107113249 A | 8/2017 |
| CN | 108702684 A | 10/2018 |

(Continued)

OTHER PUBLICATIONS

Alcatel-Lucent, et al., "Support of Load and Overload Control over S2a and S2b," 3GPP Draft, SA WG2 Meeting #102, S2-141328_23402R12_LOAD-OVERLOAD-CONTROL-OVER-S2A-S2B, 3rd Generation Partnership Project (3GPP), Mobile Competence Centre, 650, Route Des Lucioles, F-06921, Sophia-Antipolis Cedex, France, vol. SA WG2. No. Malta, Mar. 24, 2014-Mar. 28, 2014, Mar. 27, 2014 (Mar. 27, 2014), XP050804797, 3 pages, Retrieved from the Internet: URL: http://www.3gpp.org/ftp/Meetings_3GPP_SYNC/SA2/Docs/ [retrieved on Mar. 27, 2014], the whole document.

(Continued)

*Primary Examiner* — Adnan Baig
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network, a procedure rejection message for non-cellular access at a non-access stratum (NAS) layer, and provide a first congestion indication from the NAS layer to lower layers for non-cellular access based at least in part on the receiving the procedure rejection message. The UE may refrain, at the lower layers, from initiating establishment of a signaling connection based at least in part on the first congestion indication. Numerous other aspects are provided.

30 Claims, 6 Drawing Sheets

(56) References Cited

U.S. PATENT DOCUMENTS

| | | | |
|---|---|---|---|
| 2009/0239574 A1* | 9/2009 | Hussain | H04W 52/0229 455/574 |
| 2013/0301547 A1 | 11/2013 | Gupta et al. | |
| 2014/0355417 A1 | 12/2014 | Kim et al. | |
| 2015/0067819 A1* | 3/2015 | Shribman | H04L 63/029 709/218 |
| 2015/0163811 A1* | 6/2015 | Konstantinou | H04W 76/16 370/329 |
| 2016/0255050 A1* | 9/2016 | Grayson | H04L 63/1433 726/1 |
| 2018/0191493 A1* | 7/2018 | Huang | H04L 63/061 |
| 2018/0279400 A1 | 9/2018 | Faccin et al. | |
| 2020/0015311 A1 | 1/2020 | Kim | |
| 2021/0029628 A1* | 1/2021 | Kim | H04W 48/18 |
| 2021/0360569 A1* | 11/2021 | Park | H04W 8/02 |
| 2022/0124864 A1* | 4/2022 | Pham Van | H04W 76/27 |

FOREIGN PATENT DOCUMENTS

| | | |
|---|---|---|
| CN | 110719607 A | 1/2020 |
| TW | 201944843 A | 11/2019 |
| WO | 2019216526 A1 | 11/2019 |

OTHER PUBLICATIONS

International Search Report and Written Opinion—PCT/US2021/070630—ISA/EPO—Sep. 9, 2021.

CATT: "UE Supports the NAS Back-Off Timer", 3GPP TSG SA WG2 Meeting #81, S2-104876 (Revision of S2-10xxxx), Oct. 11, 2010-Oct. 15, 2010, Prague, Czech Republic, 2 Pages, XP050459664. Oct. 11, 2010.

Huawei, et al., "Handling of Back-Off Timers Under NAS Level Congestion", 3GPP TSG SA WG2 Meeting #84, S2-111476, Apr. 11, 2011-Apr. 15, 2011, Bratislava, Slovakia, 5 Pages, XP050524432. Nov. 11, 2011.

Secretary of SA WG2: "Draft Report of SA WG2 Meetings #81", SA WG2 Meeting #81, Version 0.1.0, Oct. 11, 2010-Oct. 15, 2010, Prague, Czech Republic, 3GPP TSG SA WG2 Meeting #82, TD S2-105323, Nov. 15, 2010-Nov. 15, 2010, Jacksonville, Florida, USA, pp. 1-197, XP050467796. Nov. 15, 2010-Nov. 19, 2010.

Taiwan Search Report—TW110119450—TIPO—Nov. 20, 2024.

* cited by examiner

NON-ACCESS STRATUM CONGESTION INDICATIONS

CROSS-REFERENCE TO RELATED APPLICATION

This patent application claims priority to U.S. Provisional Patent Application No. 63/033,812, filed on Jun. 2, 2020, entitled "NON-ACCESS STRATUM CONGESTION INDICATIONS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for non-access stratum congestion indications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a user equipment (UE), may include receiving, from a network, a procedure rejection message for non-cellular access at a non-access stratum (NAS) layer, providing a first congestion indication from the NAS layer to lower layers for non-cellular access based at least in part on the receiving the procedure rejection message, and refraining, at the lower layers, from initiating establishment of a signaling connection based at least in part on the first congestion indication.

In some aspects, a method of wireless communication, performed by a UE, may include receiving, from a network, a procedure rejection message for non-cellular access at a NAS layer, providing a congestion indication from the NAS layer to lower layers for non-cellular access based at least in part on the receiving the procedure rejection message, determining, at the lower layers, whether to select another network or access point for non-cellular access based at least in part on the congestion indication, and selecting another network or access point over non-cellular access based at least in part on determining, at the lower layers, to select another network or access point for non-cellular access.

In some aspects, a method of wireless communication, performed by a network device comprising, may include receiving a registration request or a service request from a UE at a NAS layer using a signaling connection established at lower layers for non-cellular access in a network, identifying a congestion condition in the network, transmitting a procedure rejection message to the UE based at least in part on the identifying the congestion condition, and providing a congestion indication to the lower layers in the network based at least in part on the identifying the congestion condition.

In some aspects, a UE for wireless communication may include a memory and one or more processors coupled to the memory. The one or more processors may be configured to receive, from a network, a procedure rejection message for non-cellular access at a NAS layer, provide a first congestion indication from the NAS layer to lower layers for non-cellular access based at least in part on the receiving the procedure rejection message, and refrain, at the lower layers, from initiating establishment of a signaling connection based at least in part on the first congestion indication.

In some aspects, a UE for wireless communication may include a memory and one or more processors coupled to the memory. The one or more processors may be configured to receive, from a network, a procedure rejection message for non-cellular access at a NAS layer, provide a congestion indication from the NAS layer to lower layers for non-cellular access based at least in part on the receiving the procedure rejection message, determine, at the lower layers, whether to select another network or access point for non-cellular access based at least in part on the congestion indication, and select another network or access point over non-cellular access based at least in part on determining, at the lower layers, to select another network or access point for non-cellular access.

In some aspects, a network device for wireless communication may include a memory and one or more processors coupled to the memory. The one or more processors may be configured to receive a registration request or a service request from a UE at a NAS layer using a signaling connection established at lower layers for non-cellular access in a network, identify a congestion condition in the network, transmit a procedure rejection message to the UE based at least in part on the identifying the congestion condition, and provide a congestion indication to the lower layers in the network based at least in part on the identifying the congestion condition.

In some aspects, a non-transitory computer-readable medium may store one or more instructions for wireless communication. The one or more instructions, when executed by one or more processors of a UE, may cause the one or more processors to receive, from a network, a procedure rejection message for non-cellular access at a NAS layer, provide a first congestion indication from the NAS layer to lower layers for non-cellular access based at least in part on the receiving the procedure rejection message, and refrain, at the lower layers, from initiating establishment of a signaling connection based at least in part on the first congestion indication.

In some aspects, a non-transitory computer-readable medium may store one or more instructions for wireless communication. The one or more instructions, when executed by one or more processors of a UE, may cause the one or more processors to receive, from a network, a procedure rejection message for non-cellular access at a NAS layer, provide a congestion indication from the NAS layer to lower layers for non-cellular access based at least in part on the receiving the procedure rejection message, determine, at the lower layers, whether to select another network or access point for non-cellular access based at least in part on the congestion indication, and select another network or access point over non-cellular access based at least in part on determining, at the lower layers, to select another network or access point for non-cellular access.

In some aspects, a non-transitory computer-readable medium may store one or more instructions for wireless communication. The one or more instructions, when executed by one or more processors of a network device, may cause the one or more processors to receive a registration request or a service request from a UE at a NAS layer using a signaling connection established at lower layers for non-cellular access in a network, identifying a congestion condition in the network, transmit a procedure rejection message to the UE based at least in part on the identifying the congestion condition, and provide a congestion indication to the lower layers in the network based at least in part on the identifying the congestion condition.

In some aspects, an apparatus for wireless communication may include means for receiving, from a network, a procedure rejection message for non-cellular access at a NAS layer, means for providing a first congestion indication from the NAS layer to lower layers for non-cellular access based at least in part on the receiving the procedure rejection message, and means for refraining, at the lower layers, from initiating establishment of a signaling connection based at least in part on the first congestion indication.

In some aspects, an apparatus for wireless communication may include means for receiving, from a network, a procedure rejection message for non-cellular access at a NAS layer, means for providing a congestion indication from the NAS layer to lower layers for non-cellular access based at least in part on the receiving the procedure rejection message, means for determining, at the lower layers, whether to select another network or access point for non-cellular access based at least in part on the congestion indication, and means for selecting another network or access point over non-cellular access based at least in part on determining, at the lower layers, to select another network or access point for non-cellular access.

In some aspects, an apparatus for wireless communication may include means for receiving a registration request or a service request from a UE at a NAS layer using a signaling connection established at lower layers for non-cellular access in a network, means for identifying a congestion condition in the network, means for transmitting a procedure rejection message to the UE based at least in part on the identifying the congestion condition, and means for providing a congestion indication to the lower layers in the network based at least in part on the identifying the congestion condition.

Aspects generally include a method, apparatus, system, computer program product, non-transitory computer-readable medium, UE, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
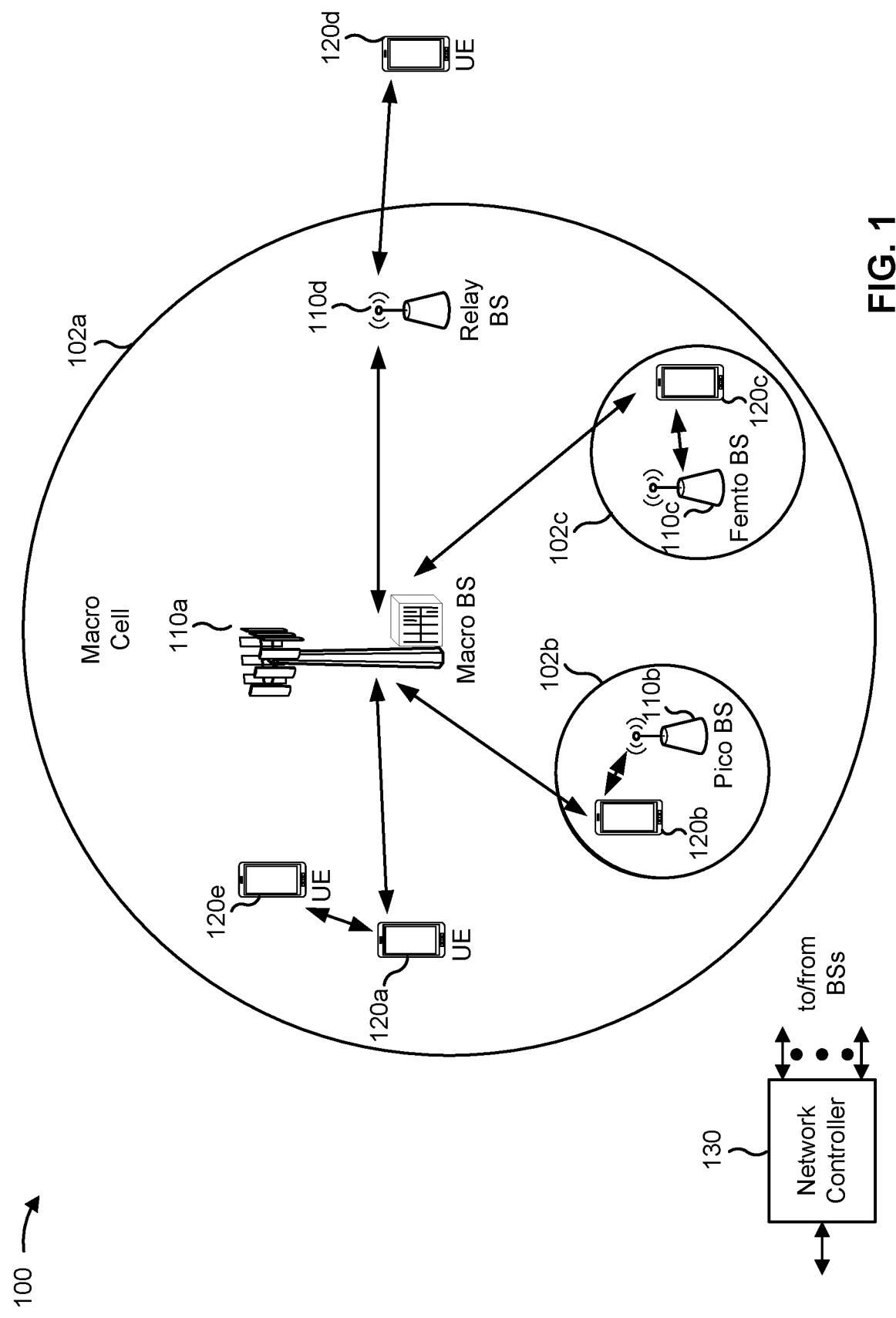
FIG. 1 is a block diagram conceptually illustrating an example of a wireless communication network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
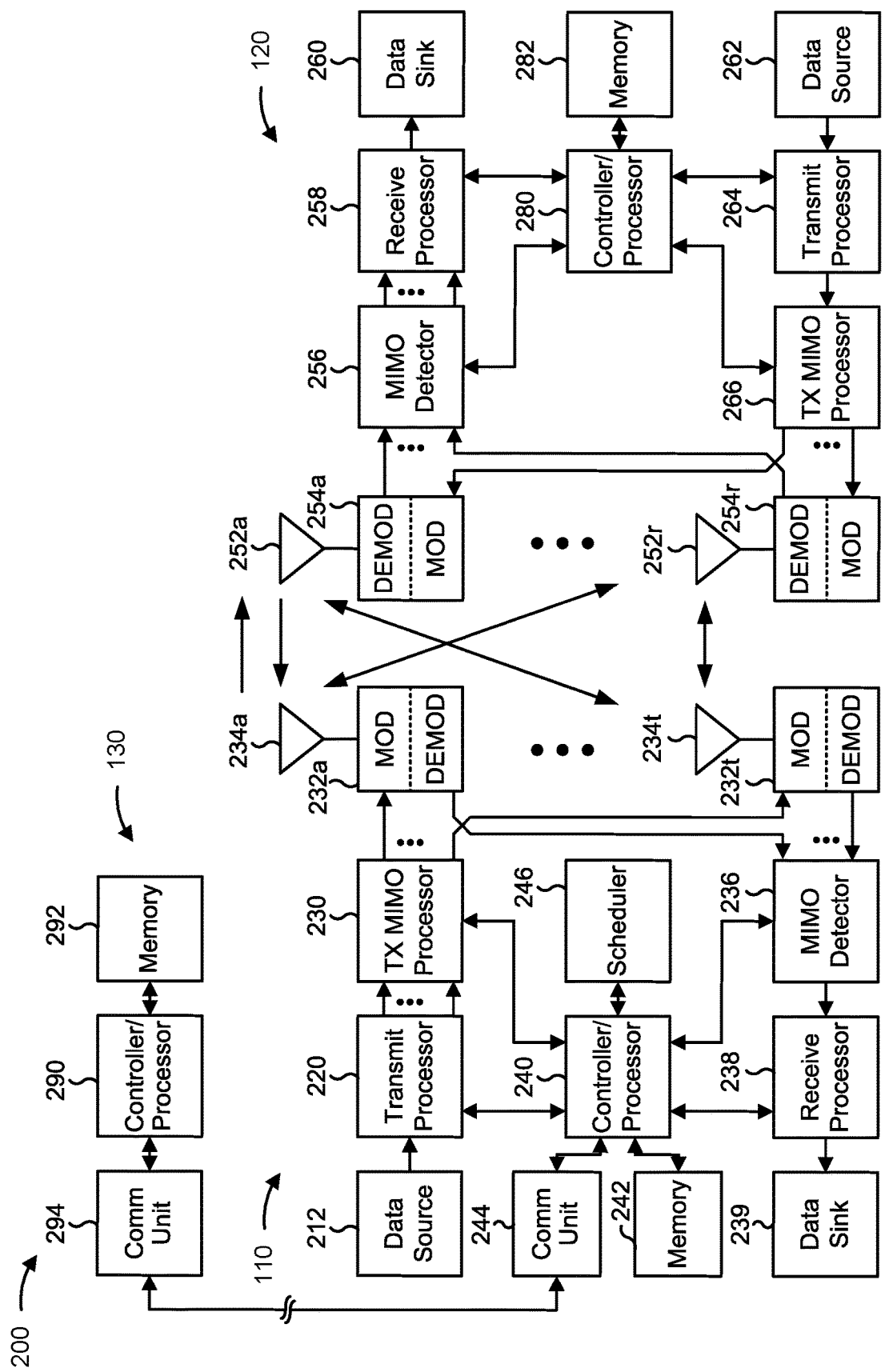
FIG. 2 is a block diagram conceptually illustrating an example of a base station in communication with a user equipment (UE) in a wireless communication network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-6).

Controller/processor 240 of base station 110, controller/processor 280 of UE 120, a network device with components similar to those shown for base station 110, an access and mobility management function (AMF) with components similar to those shown for base station 110, a core network function with components similar to those shown for base station 110, or a wireless local area network (WLAN) access point with components similar to those shown for base station 110, and/or any other component(s) of FIG. 2 may perform one or more techniques associated with non-access stratum (NAS) congestion indications, as described in more detail elsewhere herein. For example, controller/processor 240 of base station 110, controller/processor 280 of UE 120, a network device, an AMF, a core network function, a WLAN access point, and/or any other component(s) of FIG. 2 may perform or direct operations of, for example, process 400 of FIG. 4, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 400 of FIG. 4, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for receiving, from a network, a procedure rejection message for non-cellular access at a NAS layer, means for providing a first congestion indication from the NAS layer to lower layers for non-cellular access based at least in part on the receiving the procedure rejection message, means for refraining, at the lower layers, from initiating establishment of a signaling connection based at least in part on the first congestion indication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving, from a network, a procedure rejection message for non-cellular access at a NAS layer, means for providing a congestion indication from the NAS layer to lower layers for non-cellular access based at least in part on the receiving the procedure rejection message, means for determining, at the lower layers, whether to select another network or access point for non-cellular access based at least in part on the congestion indication, means for selecting another network or access point over non-cellular access based at least in part on determining, at the lower layers, to select another network or access point for non-cellular access, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a network device may include means for identifying a congestion condition in a network, means for receiving a registration request or a service request from UE at a NAS layer using a signaling connection established at lower layers for non-cellular access in the network, means for transmitting a procedure rejection message to the UE based at least in part on the identifying the congestion condition, means for providing a congestion indication to the lower layers in the network based at least in part on the identifying the congestion condition, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

NAS is a functional layer in wireless protocol stacks between a core network and a UE. The NAS layer is used to manage the establishment of communication sessions and to maintain continuous communications with the UE as the UE moves. Maintaining continuous communications as the UE moves may involve using a NAS mobility management procedure, which may be a 5G mobility management (5GMM) procedure. A UE may initiate a 5GMM registration procedure or a 5GMM service request procedure with a 5G network. The network may provide a value for a 5GMM back off timer (e.g., timer T3346) in a rejected 5GMM procedure. Upon receiving the value for the back off timer, the UE may start the back off timer. The UE cannot initiate any 5GMM procedure while the back off timer is running.

In a 5G network, a NAS protocol is used over both 3GPP access and non-3GPP access (e.g., wireless local area network (WLAN)/Wi-Fi). Non-3GPP access may be referred to as non-cellular access, provided through non-cellular access points. Registration and service request procedures may also be used over non-3GPP access. The network may also send a back off timer over non-3GPP access. Over non-3GPP access, a trigger for initiating a 5GMM procedure comes from lower layers. The lower layers over non-3GPP access are a WLAN connectivity layer and an internet protocol (IP) security (IPSec) layer.

When the WLAN connectivity layer establishes IP connectivity for a UE via a WLAN access point, IPSec tunnel setup procedures are triggered in the lower layers to establish IPSec to an evolved packet data gateway (ePDG) in the 5G core network. At this point, the signaling connection to the 5G core network in the lower layers is established. The UE may establish that the signaling connection in the lower layers is the trigger for initiating a 5GMM procedure in the NAS layer (e.g., registration procedure or service request procedure). This is different from 3GPP access, where it is the NAS layer that triggers the 5GMM procedure, which in turn triggers the establishment of the signaling connection in the lower layers.

As explained above, the lower layers of the UE using non-3GPP access may establish a signaling connection (WLAN connectivity and an IPSec tunnel to the ePDG), and the trigger for a service procedure may be provided from the lower layers to the NAS layer. The NAS layer (or the UE for the NAS layer) may initiate the service request procedure.

The network may reject the service request procedure and provide a back off timer value to the NAS layer in a service reject message. The network may release the signaling connection (ePDG releases the IPSec tunnel). However, nothing may stop the lower layers from reestablishing the signaling connection (i.e., WLAN IP connectivity and IPSec establishment again).

One solution is for the NAS layer to block the service request procedure at the NAS layer while the back off timer is running. When the back off timer expires, the NAS layer initiates the service request procedure. A disadvantage of this solution is that the signaling connection in the lower layers is maintained while the NAS layer is blocked. From a power consumption point of view, maintaining a non-usable signaling connection over WLAN is inefficient. The lower layers are consuming power to maintain the non-usable signaling connection. If the back off timer is long, such as more than 15 minutes, the UE may look for another network to connect to over non-3GPP access. The UE may waste processing resources and signaling resources.

According to various aspects described herein, the NAS 5GMM layer may provide an indication to the lower layers that a timer (e.g., back off timer T3346) is running at the NAS layer. While the timer is running, the lower layers may not initiate establishment of signaling connections. Alternatively, or additionally, if the timer value is provided by the NAS layer, the lower layers may decide to implement power saving mechanisms while the timer is running (e.g., disable WLAN). When the timer expires, the NAS layer may provide an indication to the lower layers that the congestion timer has been stopped at the NAS layer. The lower layers may establish a signaling connection (WLAN connectivity and IPSec tunnel to ePDG). As a result, the UE may save power.

In some aspects, the NAS layer may provide a value for the timer to the lower layers. In some aspects, the lower layers may determine to search for another network to connect to over non-3GPP access. For example, if the value for the timer was provided to the lower layers, the lower layers may determine that the value is too long, and there is a need to obtain WLAN connectivity sooner. The lower layers may select another access point or network. As a result, a user of the UE may have a better experience.

In some aspects, an access point of a network may release the signaling connection (ePDG releases the IPSec tunnel). The ePDG may release the IPSec tunnel towards the UE with a congestion indication and the backoff timer value (via lower layer signaling). The lower layers may start the backoff timer and not initiate signaling connection establishment while the timer is running. When the timer expires, lower layers may establish a signaling connection (WLAN connectivity and IPSec tunnel to ePDG). As a result, the UE and the network may save signaling resources.

Figure 3:
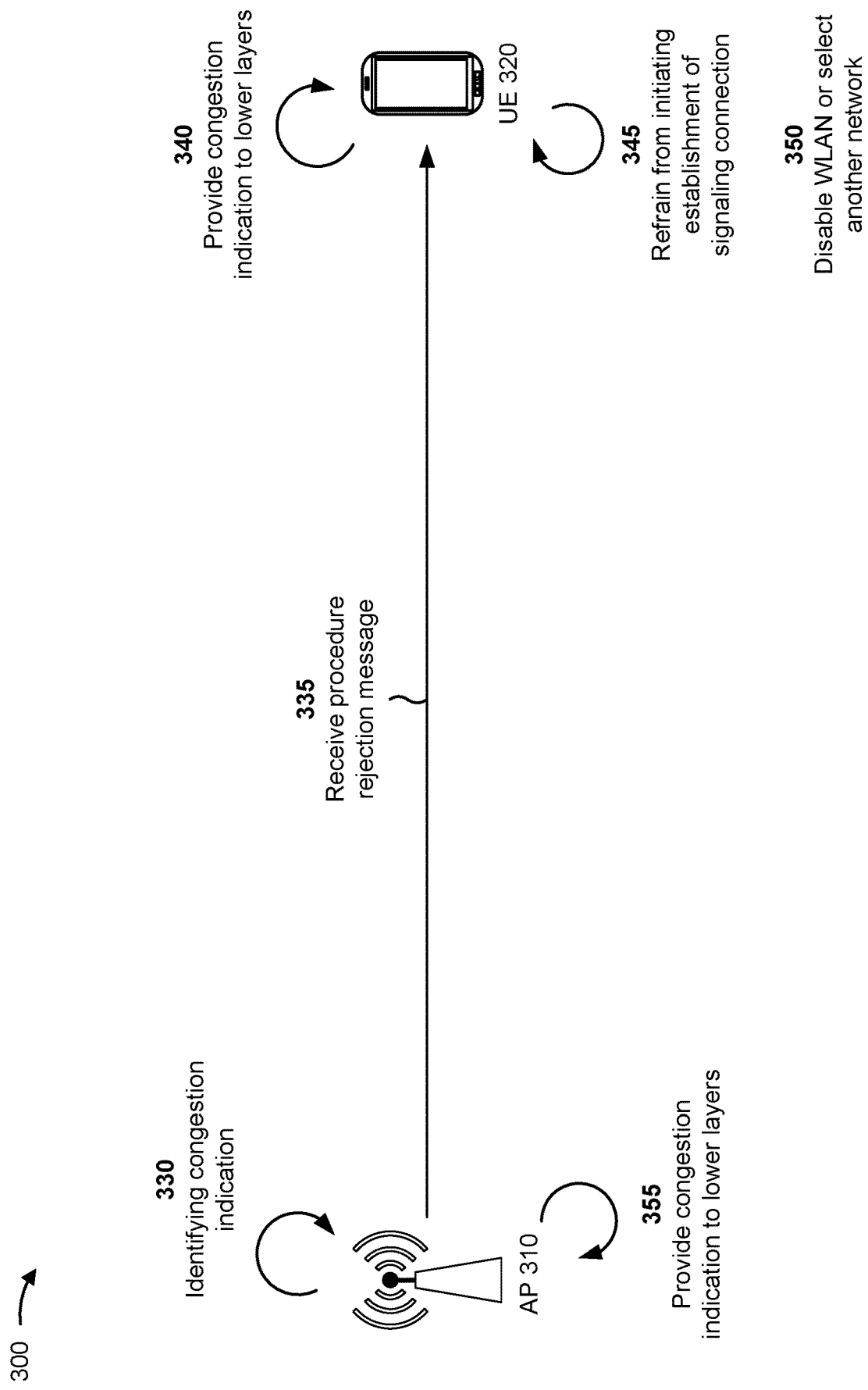
FIG. 3 is a diagram illustrating an example of non-access stratum congestion indications, in accordance with the present disclosure.

FIG. 3 is a diagram illustrating an example 300 of NAS congestion indications, in accordance with the present disclosure. As shown in FIG. 3, an access point (AP) 310 and a UE 320 (e.g., a UE 120 depicted in FIGS. 1 and 2) may communicate with one another.

As shown by reference number 330, AP 310 may determine that there is congestion at an AMF and identify a congestion indication to send to UE 320. UE 320 may transmit a registration request or a service request for non-3GPP access. As shown by reference number 335, UE 320 may receive a procedure rejection message. This may be due to congestion at the AMF. The rejection message may include a value for a back off timer. UE 320 may start the back off timer.

In some aspects, UE 320 may provide a congestion indication from the NAS layer to the lower layers, as shown by reference number 340. As shown by reference number 345, UE 320 may refrain from initiating establishment of a signaling connection (as signaling connections may originate from the lower layers for non-3GPP access). In some aspects, UE 320 may take further action, as shown by reference number 350. For example, the lower layers (or the UE for the lower layers) may disable WLAN use to save power. Alternatively, the lower layers (or the UE for the lower layers) may select another network or another AP. The UE may determine to select another network or another AP based at least in part on a value of the back off timer (e.g., if the back off timer is too long).

In some aspects, AP 310 may share a congestion indication from the NAS layer to the lower layers in the network, as shown by reference number 355. AP 310 may coordinate, synchronize, and/or link information and/or actions taken on behalf of the AMF with information and/or actions taken on behalf of the ePDG as a result of sharing congestion indications between the NAS layer and the lower layers. In some aspects, information and/or actions taken by the NAS layer may be coordinated, synchronized, and/or linked to information and/or actions taken by the lower layers. As a result, the UE and the network saves time, processing resources, and signaling resources.

In some aspects, the UE may establish a signaling connection in the lower layers over non-3GPP access, and initiate a 5GMM procedure at the NAS layer using the signaling connection based at least in part on the establishing of the signaling connection in the lower layers. The UE may receive a procedure rejection message from the network over non-3GPP access, where the procedure rejection message includes a congestion back off timer value. The UE may provide a first congestion indication to the lower layers of the non-3GPP access based at least in part on the procedure rejection message. The UE may start the back off timer (e.g., T3346) at the 5GMM layer using the back off timer value. The UE may refrain from initiating establishing a signaling connection in the lower layers based at least in part on the first congestion indication. When the back off timer T3346 expires, the UE may provide a second congestion indication to the lower layers. The UE may stop refraining from initiating establishment of a signaling connection in the lower layers based at least in part on the second congestion indication.

In some aspects, the 5GMM procedure may include a registration procedure or a service request procedure. Initiating the 5GMM procedure may include sending a REGISTRATION REQUEST message or a SERVICE REQUEST message. Initiating the 5GMM procedure at the NAS layer using the signaling connection and based at least in part on the establishing of the signaling connection in the lower layers may include receiving an indication from the lower layers that a signaling connection is established. A procedure rejection message may include a REGISTRATION REJECT message or a SERVICE REJECT message. The procedure rejection message may contain a cause value indicating congestion.

In some aspects, the method may include initiating a 5GMM procedure at the NAS layer using the signaling connection and based at least in part on the establishing of the signaling connection in the lower layers. In some aspects, the method may include providing the value of the back off timer to the lower layer along with the first congestion indication. In some aspects, the method may include implementing power saving mechanisms in the lower layers based at least in part on the first indication (and the back off timer value). In some aspects, the power saving mechanisms in the lower layers may include disabling WLAN use, blocking IPSec establishment, and/or the like.

In some aspects, the UE may determine, at the lower layers, to select to another network. For example, the UE may establish a signaling connection in the lower layers over non-3GPP access, and initiate a 5GMM procedure at the NAS layer using the signaling connection and based at least in part on the establishing of the signaling connection in the lower layers. The UE may receive a procedure rejection message from the network over non-3GPP access, where the procedure rejection message includes a congestion back off timer value. The UE may provide a congestion indication to the lower layers of the non-3GPP access based at least in part on the procedure rejection message. The UE may determine, at the lower layers, whether to select another network over non-3GPP access based at least in part based on the congestion indication. The UE may select another network over non-3GPP access based at least in part on the determination.

In some aspects, the congestion indication may include the back off timer value. In some aspects, determining, at the lower layers, whether to select another network over non-3GPP access based at least in part on the congestion indication includes determining whether to select another network over non-3GPP access based at least in part on the back off timer value. The larger the back off timer value, the greater the incentive to select another network. In some aspects, the method may include establishing a signaling connection, initiating a 5GMM procedure with the newly selected network, and stopping timer T3346.

In some aspects, a base station of the network may link a congestion indication at the NAS layer with a congestion indication at the lower layers. For example, the base station may establish a signaling connection in the lower layers over non-3GPP access with a UE. The base station may receive a 5GMM procedure request from the UE at the NAS layer using the signaling connection and based at least in part on the establishing of the signaling connection in the lower layers. The base station may identify a congestion condition in the network and send a 5GMM procedure rejection message to the UE over non-3GPP access, where the 5GMM procedure rejection message includes a congestion back off timer value. The base station may provide a congestion indication to the lower layers of the non-3GPP access in the network based at least in part on identifying the congestion condition. The base station may release the signaling connection in the lower layers over non-3GPP access. The connection release message may indicate congestion and include a back off timer.

In some aspects, the base station may establish a signaling connection in the lower layers over non-3GPP access with a UE comprises establishing IPSec connection between ePDG in the network and the UE. The base station may receive a 5GMM procedure request from the UE at the NAS layer, and this may include receiving the 5GMM procedure request in an access and mobility management function (AMF) in the network. The base station may identify a congestion condition in the network by identifying AMF congestion. The base station may provide a congestion indication to the lower layers of the non-3GPP access in the network based at least in part on identifying the congestion condition by sending a congestion indication from the AMF to the ePDG. The base station may release the signaling connection in the lower layers over non-3GPP access by sending a connection release message from the ePDG to the UE. The back off timer may be based at least in part on the back off timer.

As indicated above, FIG. 3 is provided as an example. Other examples may differ from what is described with regard to FIG. 3.

Figure 4:
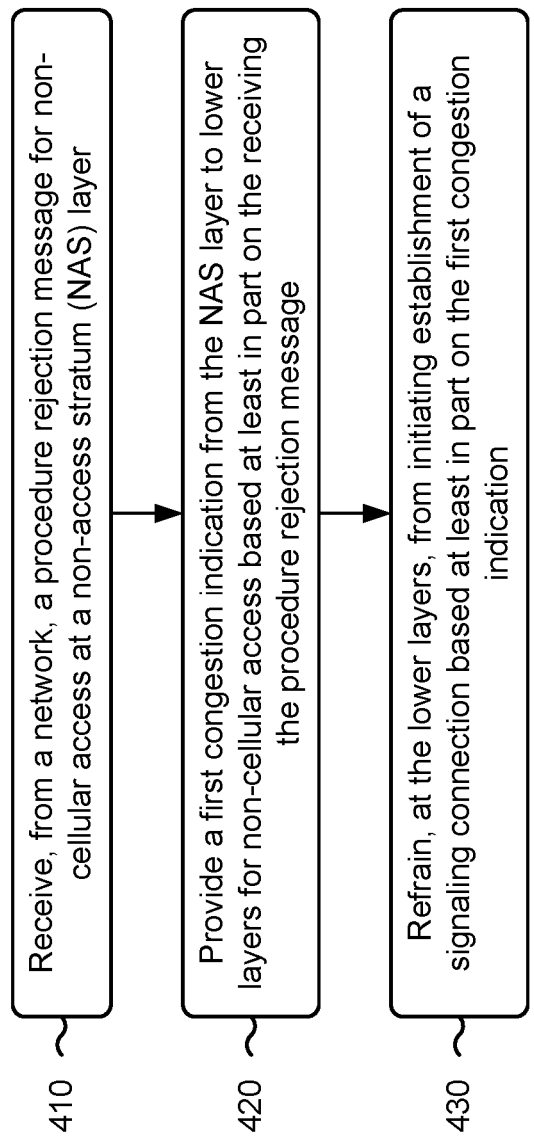
FIG. 4 is a diagram illustrating an example process performed, for example, by a UE, in accordance with the present disclosure.

FIG. 4 is a diagram illustrating an example process 400 performed, for example, by a UE, in accordance with the present disclosure. Example process 400 is an example where the UE (e.g., a UE 120 depicted in FIGS. 1 and 2, the UE depicted in FIG. 3) performs operations associated with NAS congestion indications.

As shown in FIG. 4, in some aspects, process 400 may include receiving, from a network, a procedure rejection message for non-cellular access at a NAS layer (block 410). For example, the UE (e.g., using receive processor 258, transmit processor 264, controller/processor 280, memory 282) may receive, from a network, a procedure rejection message for non-cellular access at a NAS layer, as described above.

As further shown in FIG. 4, in some aspects, process 400 may include providing a first congestion indication from the NAS layer to lower layers for non-cellular access based at least in part on the receiving the procedure rejection message (block 420). For example, the UE (e.g., using receive processor 258, transmit processor 264, controller/processor 280, memory 282) may provide a first congestion indication from the NAS layer to lower layers for non-cellular access based at least in part on the receiving the procedure rejection message, as described above.

As further shown in FIG. 4, in some aspects, process 400 may include refraining, at the lower layers, from initiating establishment of a signaling connection based at least in part on the first congestion indication (block 430). For example, the UE (e.g., using receive processor 258, transmit processor 264, controller/processor 280, memory 282) may refrain, at the lower layers, from initiating establishment of a signaling connection based at least in part on the first congestion indication, as described above.

Process 400 may include additional aspects, such as any single aspect or any combination of aspects described below and/or in connection with one or more other processes described elsewhere herein.

In a first aspect, process 400 includes implementing power saving mechanisms at the lower layers based at least in part on the first congestion indication.

In a second aspect, alone or in combination with the first aspect, the lower layers for non-cellular access include one or more of a WLAN connectivity layer or an IPSec layer.

In a third aspect, alone or in combination with one or more of the first and second aspects, process 400 includes disabling WLAN connectivity based at least in part on the first congestion indication.

In a fourth aspect, alone or in combination with one or more of the first through third aspects, process 400 includes blocking IPSec establishment based at least in part on the first congestion indication.

In a fifth aspect, alone or in combination with one or more of the first through fourth aspects, process 400 includes starting a back off timer at the NAS layer using the back off timer value, providing a second congestion indication from the NAS layer to the lower layers based at least in part on expiration of the back off timer, and enabling initiating establishment of a signaling connection in the lower layers based at least in part on the second congestion indication.

In a sixth aspect, alone or in combination with one or more of the first through fifth aspects, process 400 includes providing the back off timer value from the NAS layer to the lower layers with the first congestion indication.

In a seventh aspect, alone or in combination with one or more of the first through sixth aspects, process 400 includes implementing power saving mechanisms at the lower layers based at least in part on the first congestion indication and the back off timer value.

In an eighth aspect, alone or in combination with one or more of the first through seventh aspects, process 400 includes initiating, a the lower layers, establishment of a signaling connection, and initiating, at the NAS layer, a registration procedure or a service request procedure based at least in part on receiving an indication from the lower layers that a signaling connection is established.

In a ninth aspect, alone or in combination with one or more of the first through eighth aspects, the procedure rejection message includes a cause value indicating congestion.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
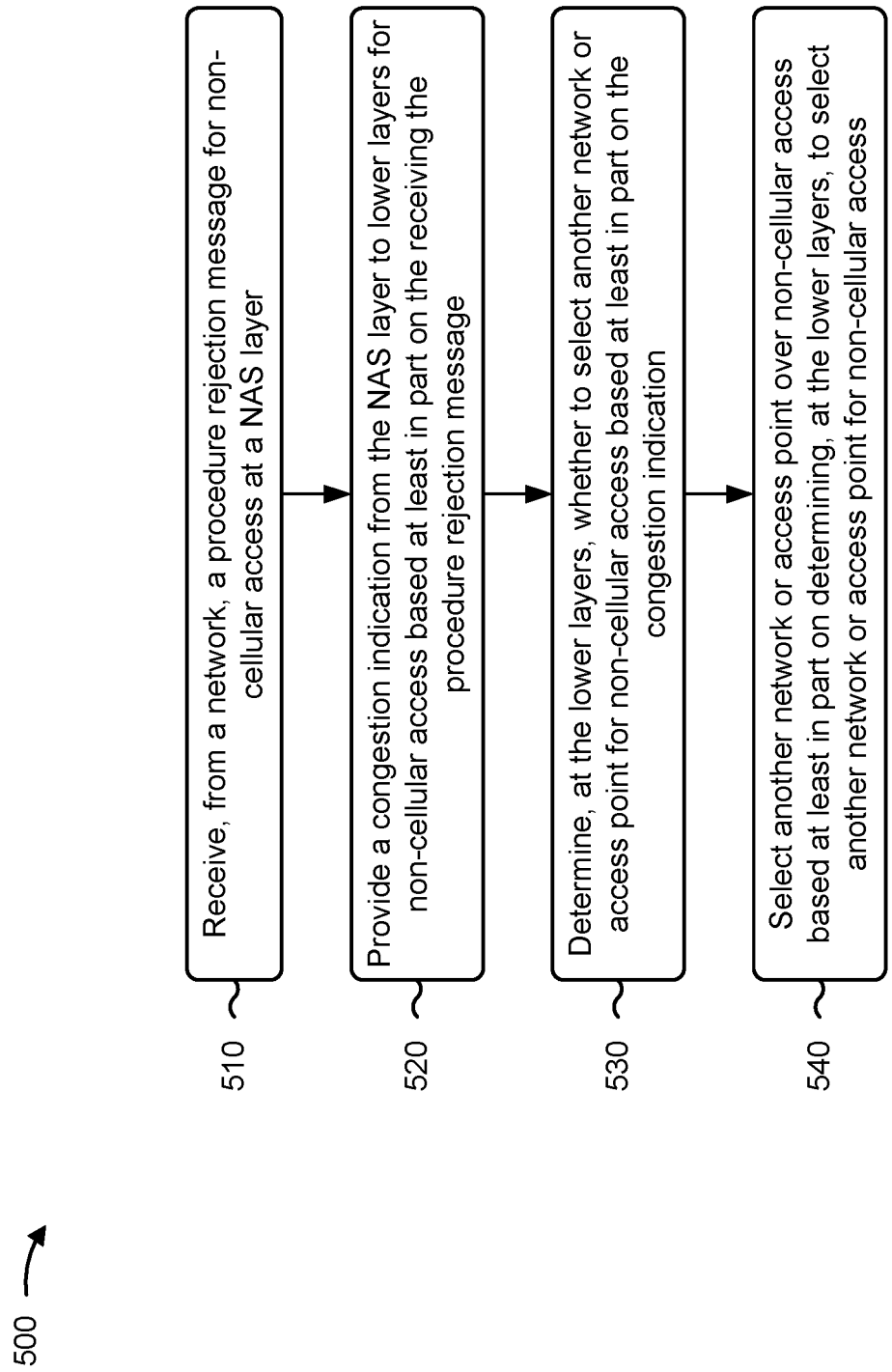
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., a UE 120 depicted in FIGS. 1 and 2, the UE depicted in FIG. 3) performs operations associated with NAS congestion indications.

As shown in FIG. 5, in some aspects, process 500 may include receiving, from a network, a procedure rejection message for non-cellular access at a NAS layer (block 510). For example, the UE (e.g., using receive processor 258, transmit processor 264, controller/processor 280, memory 282) may receive, from a network, a procedure rejection message for non-cellular access at a NAS layer, as described above.

As further shown in FIG. 5, in some aspects, process 500 may include providing a congestion indication from the NAS layer to lower layers for non-cellular access based at least in part on the receiving the procedure rejection message (block 520). For example, the UE (e.g., using receive processor 258, transmit processor 264, controller/processor 280, memory 282) may provide a congestion indication from the NAS layer to lower layers for non-cellular access based at least in part on the receiving the procedure rejection message, as described above.

As further shown in FIG. 5, in some aspects, process 500 may include determining, at the lower layers, whether to select another network or access point for non-cellular access based at least in part on the congestion indication (block 530). For example, the UE (e.g., using receive processor 258, transmit processor 264, controller/processor 280, memory 282) may determine, at the lower layers, whether to select another network or access point for non-cellular access based at least in part on the congestion indication, as described above.

As further shown in FIG. 5, in some aspects, process 500 may include selecting another network or access point over non-cellular access based at least in part on determining, at the lower layers, to select another network or access point for non-cellular access (block 540). For example, the UE (e.g., using receive processor 258, transmit processor 264, controller/processor 280, memory 282) may select another network or access point over non-cellular access based at least in part on determining, at the lower layers, to select another network or access point for non-cellular access, as described above.

Process 500 may include additional aspects, such as any single aspect or any combination of aspects described below and/or in connection with one or more other processes described elsewhere herein.

In a first aspect, the congestion indication includes a back off timer value for a back off timer, and the determining whether to select another network or access point for non-cellular access includes determining whether to select another network or access point for non-cellular access based at least in part on a result of a comparison of the back off timer value and a timer threshold.

In a second aspect, alone or in combination with the first aspect, process 500 includes initiating, at the lower layers, establishment of a signaling connection to a new network or access point based at least in part on determining to select another network or access point, and transmitting, at the NAS layer, a registration request or a service request to the new network or access point based at least in part on an indication that the signaling connection is established at the lower layers.

In a third aspect, alone or in combination with one or more of the first and second aspects, process 500 includes stopping the back off timer.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
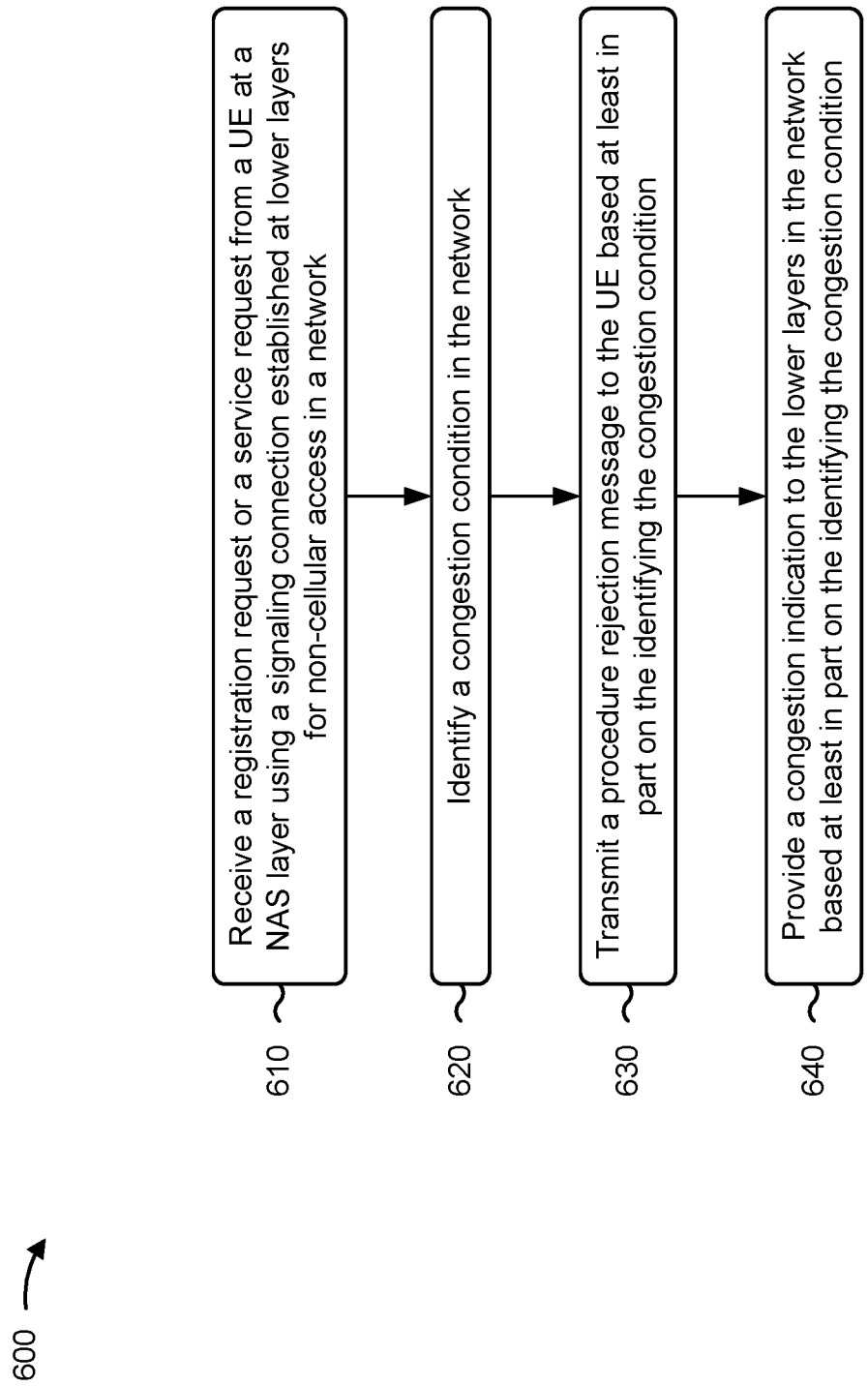
FIG. 6 is a diagram illustrating an example process performed, for example, by a network device, in accordance with the present disclosure.

FIG. 6 is a diagram illustrating an example process 600 performed, for example, by a network device, in accordance with the present disclosure. Example process 600 is an example where the network device (e.g., AP 310 depicted in FIG. 3, a core network function, an AMF) performs operations associated with NAS congestion indications.

As further shown in FIG. 6, in some aspects, process 600 may include receiving a registration request or a service request from a UE at a NAS layer using a signaling connection established at lower layers for non-cellular access in the network (block 610). For example, the network device (e.g., using receive processor 238, transmit processor 220, controller/processor 240, memory 242) may receive a registration request or a service request from a UE at a NAS layer using a signaling connection established at lower layers for non-cellular access in the network, as described above.

As shown in FIG. 6, in some aspects, process 600 may include identifying a congestion condition in a network (block 620). For example, the network device (e.g., using receive processor 238, transmit processor 220, controller/processor 240, memory 242) may identify a congestion condition in a network, as described above.

As further shown in FIG. 6, in some aspects, process 600 may include transmitting a procedure rejection message to the UE based at least in part on the identifying the congestion condition (block 630). For example, the network device (e.g., using receive processor 238, transmit processor 220, controller/processor 240, memory 242) may transmit a procedure rejection message to the UE based at least in part on the identifying the congestion condition, as described above.

As further shown in FIG. 6, in some aspects, process 600 may include providing a congestion indication to the lower layers in the network based at least in part on the identifying the congestion condition (block 640). For example, the network device (e.g., using receive processor 238, transmit processor 220, controller/processor 240, memory 242) may provide a congestion indication to the lower layers in the network based at least in part on the identifying the congestion condition, as described above.

Process 600 may include additional aspects, such as any single aspect or any combination of aspects described below and/or in connection with one or more other processes described elsewhere herein.

In a first aspect, the signaling connection at the lower layers includes an internet protocol security connection between an ePDG in the network and the UE.

In a second aspect, alone or in combination with the first aspect, the providing the congestion indication to the lower layers includes providing the congestion indication to the ePDG.

In a third aspect, alone or in combination with one or more of the first and second aspects, the identifying the congestion indication in the network includes identifying congestion at an AMF in the network.

In a fourth aspect, alone or in combination with one or more of the first through third aspects, process 600 includes releasing the signaling connection at the lower layers.

In a fifth aspect, alone or in combination with one or more of the first through fourth aspects, the releasing the signaling connection at the lower layers includes transmitting a connection release message from an ePDG in the network to the UE.

In a sixth aspect, alone or in combination with one or more of the first through fifth aspects, process 600 includes synchronizing operations, for an AMF, that are based at least in part on the congestion indication with operations, for an ePDG of the signaling connection, that are based at least in part on the congestion indication.

In a seventh aspect, alone or in combination with one or more of the first through sixth aspects, process 600 includes indicating a value for a first back off timer for the NAS layer in the congestion indication to the lower layers, and maintaining a second back off timer for the lower layers based at least in part on the value of the first back off timer.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: receiving, from a network, a procedure rejection message for non-cellular access at a non-access stratum (NAS) layer; providing a first congestion indication from the NAS layer to lower layers for non-cellular access based at least in part on the receiving the procedure rejection message; and refraining, at the lower layers, from initiating establishment of a signaling connection based at least in part on the first congestion indication.

Aspect 2: The method of Aspect 1, further comprising implementing power saving mechanisms at the lower layers based at least in part on the first congestion indication.

Aspect 3: The method of Aspect 1 or 2, wherein the lower layers for non-cellular access include one or more of a wireless local area network (WLAN) connectivity layer or an internet protocol security (IPSec) layer.

Aspect 4: The method of Aspect 3, further comprising disabling WLAN connectivity based at least in part on the first congestion indication.

Aspect 5: The method of Aspect 3 or 4, further comprising blocking IPSec establishment based at least in part on the first congestion indication.

Aspect 6: The method of any of Aspects 1-5, wherein the procedure rejection message includes a back off timer value, and wherein the method further comprises: starting a back off timer at the NAS layer using the back off timer value; providing a second congestion indication from the NAS layer to the lower layers based at least in part on expiration of the back off timer; and enabling initiating establishment of a signaling connection in the lower layers based at least in part on the second congestion indication.

Aspect 7: The method of Aspect 6, further comprising providing the back off timer value from the NAS layer to the lower layers with the first congestion indication.

Aspect 8: The method of Aspect 7, further comprising implementing power saving mechanisms at the lower layers based at least in part on the first congestion indication and the back off timer value.

Aspect 9: The method of any of Aspects 1-8, further comprising: initiating, at the lower layers, establishment of a signaling connection; and initiating, at the NAS layer, a registration procedure or a service request procedure based at least in part on receiving an indication from the lower layers that a signaling connection is established.

Aspect 10: The method of any of Aspects 1-9, wherein the procedure rejection message includes a cause value indicating congestion.

Aspect 11: A method of wireless communication performed by a user equipment (UE), comprising: receiving, from a network, a procedure rejection message for non-cellular access at a non-access stratum (NAS) layer; providing a congestion indication from the NAS layer to lower layers for non-cellular access based at least in part on the receiving the procedure rejection message; determining, at the lower layers, whether to select another network or access point for non-cellular access based at least in part on the congestion indication; and selecting another network or access point over non-cellular access based at least in part on determining, at the lower layers, to select another network or access point for non-cellular access.

Aspect 12: The method of Aspect 11, wherein the congestion indication includes a back off timer value for a back off timer, and wherein the determining whether to select another network or access point for non-cellular access includes determining whether to select another network or access point for non-cellular access based at least in part on a result of a comparison of the back off timer value and a timer threshold.

Aspect 13: The method of Aspect 12, further comprising: initiating, at the lower layers, establishment of a signaling connection to a new network or access point based at least in part on determining to select another network or access point; and transmitting, at the NAS layer, a registration request or a service request to the new network or access point based at least in part on an indication that the signaling connection is established at the lower layers.

Aspect 14: The method of Aspect 12 or 13, further comprising stopping the back off timer.

Aspect 15: A method of wireless communication performed by a network device comprising: receiving a registration request or a service request from a user equipment (UE) at a non-access stratum (NAS) layer using a signaling connection established at lower layers for non-cellular access in a network; identifying a congestion condition in the network; transmitting a procedure rejection message to the UE based at least in part on the identifying the congestion condition; and providing a congestion indication to the lower layers in the network based at least in part on the identifying the congestion condition.

Aspect 16: The method of Aspect 15, wherein the signaling connection at the lower layers includes an internet protocol security connection between an evolved packet data gateway (ePDG) in the network and the UE.

Aspect 17: The method of Aspect 16, wherein the providing the congestion indication to the lower layers includes providing the congestion indication to the ePDG.

Aspect 18: The method of any of Aspects 15-17, wherein the identifying the congestion indication in the network includes identifying congestion at an access and mobility management function in the network.

Aspect 19: The method of any of Aspects 15-18, further comprising releasing the signaling connection at the lower layers.

Aspect 20: The method of Aspect 19, wherein the releasing the signaling connection at the lower layers includes transmitting a connection release message from an evolved packet data gateway in the network to the UE.

Aspect 21: The method of any of Aspects 15-20, further comprising synchronizing operations, for an access and mobility management function, that are based at least in part on the congestion indication with operations, for an evolved packet data gateway of the signaling connection, that are based at least in part on the congestion indication.

Aspect 22: The method of any of Aspects 15-21, further comprising: indicating a value for a first back off timer for the NAS layer in the congestion indication to the lower layers; and maintaining a second back off timer for the lower layers based at least in part on the value of the first back off timer.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, software, and/or a combination of hardware and software. As used herein, a processor is implemented in hardware, software, and/or a combination of hardware and software. Software is to be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise.

It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to:
   transmit, to a network, a request for non-cellular access;
   receive, from the network, a procedure rejection message in response to the request for non-cellular access at a non-access stratum (NAS) layer, the procedure rejection message including a back off timer value;
   provide, based at least in part on the procedure rejection message, a first congestion indication, including the back off timer value, to at least one lower layer for non-cellular access, the at least one lower layer comprising one or more of a wireless local area network (WLAN) connectivity layer or an internet protocol security (IPSec) layer, to cause the at least one lower layer to be blocked from establishing a signaling connection while a back off timer at the NAS layer is running;
   refrain, at the at least one lower layer, from initiating establishment of an internet protocol security (IPSec) connection during the running of the back off timer based at least in part on the first congestion indication;
   provide a second congestion indication from the NAS layer to the at least one lower layer based at least in part on expiration of the back off timer to initiate establishment of the IPSec connection; and
   enable initiating establishment of the IPSec connection between an evolved packet data gateway in the network and the UE based at least in part on the second congestion indication.

2. The UE of claim 1, wherein the one or more processors are configured to implement power saving mechanisms at the at least one lower layer based at least in part on the first congestion indication.

3. The UE of claim 1, wherein the one or more processors are configured to disable WLAN connectivity based at least in part on the first congestion indication.

4. The UE of claim 1, wherein the one or more processors are further configured to:
   start the back off timer at the NAS layer using the back off timer value.

5. The UE of claim 1, wherein the one or more processors are configured to provide the first congestion indication from the NAS layer to the WLAN connectivity layer and the IPSec layer.

6. The UE of claim 1, wherein the one or more processors are configured to implement power saving mechanisms at the at least one lower layer based at least in part on the back off timer value.

7. The UE of claim 1, wherein the at least one lower layer comprises the WLAN connectivity layer, and wherein the one or more processors are configured to:
   initiate, at the NAS layer, a registration procedure or a service request procedure based at least in part on an indication from the WLAN connectivity layer.

8. The UE of claim 1, wherein the procedure rejection message includes a cause value indicating congestion.

9. A method of wireless communication performed by a user equipment (UE), comprising:
   transmitting, to a network, a request for non-cellular access;
   receiving, from the network, a procedure rejection message in response to the request for non-cellular access at a non-access stratum (NAS) layer, the procedure rejection message including a back off timer value;
   providing, based at least in part on the procedure rejection message, a first congestion indication, including the back off timer value, to at least one lower layer for non-cellular access, the at least one lower layer comprising one or more of a wireless local area network (WLAN) connectivity layer or an internet protocol security (IPSec) layer, to cause the at least one lower layer to be blocked from establishing a signaling connection while a back off timer at the NAS layer is running; refraining, at the at least one lower layer, from initiating establishment of an internet protocol security (IPSec) connection during the running of the back off timer based at least in part on the first congestion indication;

providing a second congestion indication from the NAS layer to the at least one lower layer based at least in part on expiration of the back off timer to initiate establishment of the IPSec connection; and enabling initiating establishment of the IPSec connection between an evolved packet data gateway in the network and the UE based at least in part on the second congestion indication.

10. The method of claim 9, further comprising implementing power saving mechanisms at the at least one lower layer based at least in part on the first congestion indication.

11. The method of claim 9, further comprising disabling WLAN connectivity based at least in part on the first congestion indication.

12. The method of claim 9, wherein the method further comprises:
starting the back off timer at the NAS layer using the back off timer value.

13. The method of claim 9, further comprising providing the first congestion indication from the NAS layer to the WLAN connectivity layer and the IPSec layer.

14. The method of claim 9, further comprising implementing power saving mechanisms at the at least one lower layer based at least in part on the back off timer value.

15. The method of claim 9, wherein the at least one lower layer comprises the WLAN connectivity layer, the method further comprising:
initiating, at the NAS layer, a registration procedure or a service request procedure based at least in part on an indication from the WLAN connectivity layer.

16. The method of claim 9, wherein the procedure rejection message includes a cause value indicating congestion.

17. The UE of claim 6, wherein the back off timer value satisfies a timer threshold associated with the implementing of the power saving mechanisms.

18. The UE of claim 7, wherein initiating the registration procedure or the service request procedure uses the IPSec connection, the one or more processors, to initiate the registration procedure or the service request procedure, are configured to:
receive a connection release message associated with releasing the IPSec connection.

19. The UE of claim 1, wherein the at least one lower layer initiates establishment of the signaling connection via an access point based at least in part on a stopping of the back off timer.

20. The UE of claim 1, wherein the first congestion indication is provided to the at least one lower layer based at least in part on a connection release message from the evolved packet data gateway, the connection release message including the back off timer based at least in part on the back off timer value.

21. The method of claim 14, wherein the back off timer value satisfies a timer threshold associated with the implementing of the power saving mechanisms.

22. A non-transitory computer-readable medium storing a set of instructions for wireless communication, the set of instructions comprising:
one or more instructions that, when executed by one or more processors of a user equipment (UE), cause the UE to:
transmit, to a network, a request for non-cellular access;
receive, from the network, a procedure rejection message in response to the request for non-cellular access at a non-access stratum (NAS) layer, the procedure rejection message including a back off timer value;
provide, based at least in part on the procedure rejection message, a first congestion indication, including the back off timer value, to at least one lower layer for non-cellular access, the at least one lower layer comprising one or more of a wireless local area network (WLAN) connectivity layer or an internet protocol security (IPSec) layer, to cause the at least one lower layer to be blocked from establishing a signaling connection while a back off timer at the NAS layer is running;
refrain, at the at least one lower layer, from initiating establishment of an internet protocol security (IPSec) connection during the running of the back off timer based at least in part on the first congestion indication;
provide a second congestion indication from the NAS layer to the at least one lower layer based at least in part on expiration of the back off timer to initiate establishment of the IPSec connection; and
enable initiating establishment of the IPSec connection between an evolved packet data gateway in the network and the UE based at least in part on the second congestion indication.

23. The non-transitory computer-readable medium of claim 22, wherein the procedure rejection message includes a cause value indicating congestion.

24. The non-transitory computer-readable medium of claim 22, wherein the one or more instructions, when executed by the one or more processors of the UE, further cause the UE to:
start the back off timer at the NAS layer, the back off timer indicated to the UE based at least in part on a connection release message from the evolved packet data gateway.

25. An apparatus for wireless communication, comprising:
means for transmitting, to a network, a request for non-cellular access;
means for receiving a procedure rejection message in response to the request for non-cellular access at a non-access stratum (NAS) layer, the procedure rejection message including a back off timer value;
means for providing, based at least in part on a procedure rejection message, a first congestion indication, including the back off timer value, to at least one lower layer for non-cellular access, the at least one lower layer comprising one or more of a wireless local area network (WLAN) connectivity layer or an internet protocol security (IPSec) layer, to cause the at least one lower layer to be blocked from establishing a signaling connection while a back off timer at the NAS layer is running;
means for refraining, at the at least one lower layer, from initiating establishment of an internet protocol security (IPSec) connection during the running of the back off timer based at least in part on the first congestion indication;

means for providing a second congestion indication from the NAS layer to the at least one lower layer based at least in part on expiration of the back off timer to initiate establishment of the IPSec connection; and means for enabling initiating establishment, between an evolved packet data gateway in the network and the apparatus, of the IPSec connection based at least in part on the second congestion indication.

26. The apparatus of claim 25, wherein the procedure rejection message includes a cause value indicating congestion.

27. The apparatus of claim 25, further comprising:
means for starting the back off timer at the NAS layer, the back off timer indicated to the apparatus based at least in part on a connection release message from the evolved packet data gateway.

28. The apparatus of claim 25, wherein the at least one lower layer comprises the WLAN connectivity layer, the apparatus further comprising:
means for initiating, at the NAS layer, a registration procedure or a service request procedure based at least in part on an indication from the WLAN connectivity layer.

29. The apparatus of claim 25, further comprising:
means for selecting another network or access point over non-cellular access based at least in part on the first congestion indication.

30. The apparatus of claim 25, wherein the back off timer is based at least in part on the back of timer value.

* * * * *